United States Patent

[11] 3,545,802

[72] Inventor John W. Rich
Sacramento, Calif.
[21] Appl. No. 529,738
[22] Filed Feb. 24, 1966
Continuation-in-part of Ser. No. 420,314,
Dec. 22, 1964, Patent No. 3,284,122
[45] Patented Dec. 8, 1970
[73] Assignee John Rich Enterprises, Inc.
Dover, Del.
a corporation of Delaware

[54] LIQUID SHOCK ABSORBING BUFFER
10 Claims, 6 Drawing Figs.
[52] U.S. Cl. ................................................ 293/1,
104/254, 213/1, 213/223; 215/1,
215/52, 215/99, 228/38.5, 244/138, 256/1,
256/13.1; 267/139, 293/60, 293/70,
293/71, 293/72
[51] Int. Cl. .......................................... B60r 19/02,
B61f 19/04, F16f 9/10
[50] Field of Search ................................. 94/15;
215/1, 1.5, 52, 99; 228/38.5; 244/138; 256/13.1,
1; 293/51(F), 52(F), 62, 71, 71(P), 1, 60, 63, 69,
70, 72; 213/1(A), 223; 104/254; 220/38.5;
267/116, 139, 140, 141, 151, 152, 153

[56] References Cited
UNITED STATES PATENTS
| 193,015 | 7/1877 | McCarthy | 220/38.5 |
| 876,504 | 1/1908 | Tabler | 220/38.5 |
| 900,223 | 10/1908 | Smith | 215/99X |
| 1,313,282 | 8/1919 | Finnegan | 293/71 |
| 1,402,324 | 1/1922 | Van Gelder | 293/71 |
| 1,677,403 | 7/1928 | Morrison | 220/38.5X |
| 2,650,851 | 9/1953 | Lepponen | 293/69 |
| 2,712,913 | 7/1955 | Stanley | 244/138 |
| 2,731,290 | 1/1956 | Corydon | 293/71X |
| 2,829,915 | 4/1958 | Clareau | 293/63X |
| 2,964,139 | 12/1960 | Wittl et al. | 244/138X |
| 3,097,725 | 7/1963 | Peterson | 213/1X |

FOREIGN PATENTS
| 21,998 | 8/1923 | Australia | |

Primary Examiner—Arthur L. La Point
Assistant Examiner—Howard Beltran
Attorney—Kimmel, Crowell & Weaver ABSTRACT: A deformable opening and a commensurately deformable closure plug for reception therein for a liquid filled shock absorbing buffer of the bumper type for automobiles which will permit the closure plug to be removed from the opening even though both are deformed by an impact is disclosed.

PATENTED DEC 8 1970

3,545,802

INVENTOR.
JOHN W. RICH

BY *Kimmel, Crowell & Weaver*
ATTORNEYS.

LIQUID SHOCK ABSORBING BUFFER

This application is a continuation-in-part of my copending application Ser. No. 420,314, filed Dec. 22, 1964, now U.S. Pat. No. 3,284,122, issued Nov. 8, 1966, the disclosure of which is incorporated herein by reference, with the instant invention comprising an improvement thereover.

In using and experimenting with the bumper of the aforementioned application, it has been found that the openings through which captive liquid escapes become deformed by thermal contraction and expansion, impact of the bumper with other objects, and for other reasons not entirely ascertainable at this time. Because of the configuration of the opening and plug in the aforementioned application, deformation of the opening will result in a more tenacious holding of the plug therein thus interfering with the separation of the plug and opening upon impact of the bumper with another object.

It is accordingly a primary object of the instant invention to provide a shock proof bumper in which a captive liquid is released through at least one openable closure with the forces necessary to open the closure being uneffected by deformation thereof.

Another object of the instant invention is to provide a shock proof bumper of the character described in which the openable closure is formed by a deformation susceptible passageway in the bumper and a commensurately deformable resilient plug positioned therein for accommodating the deformations of the passageway.

A further object of the instant invention is to provide a shock proof bumper of the character described in which means are provided for retaining the plug and bumper in spaced relation upon separation of the plug.

A still further object of the instant invention is to provide a shock proof bumper and retaining means of the character described which are hidden from view thereby promoting the esthetic values of the bumper.

Other objects and advantages of the instant invention reside in the combinations of elements, arrangements of parts, and features of construction, all as will be more fully pointed out hereinafter and disclosed in the accompanying drawing wherein there is shown a preferred embodiment of this inventive concept.

IN THE DRAWING

Figure 1:
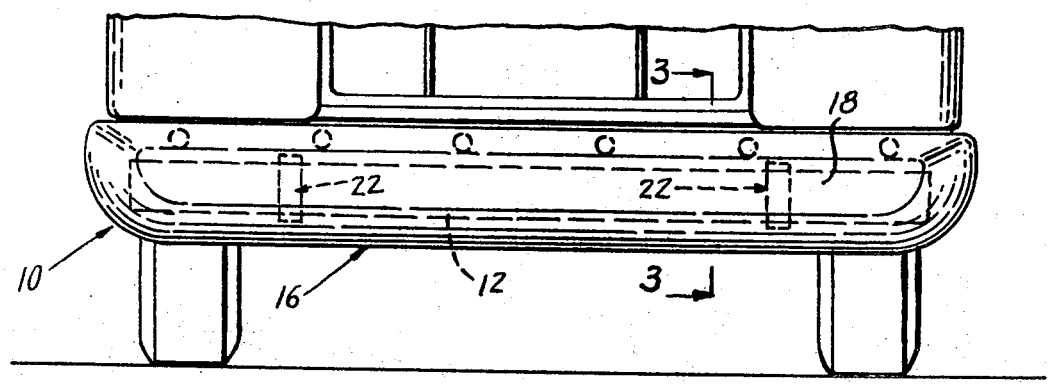
FIG. 1 is a fragmentary rear elevational view of a motor vehicle showing the bumper of the instant invention attached thereto.

Referring now to the drawing in detail, wherein like reference characters designate like elements throughout the several views thereof, there is indicated generally at 10 the rear end of a motor vehicle such as an automobile, truck or the like, which is provided with a rigid vertical facing 12 extending transversely along the rear of the vehicle and connected thereto by a plurality of braces 14. It should be understood that facing 12 may be the conventional bumper of the motor vehicle or a substantially straight plate in lieu thereof. The shock proof bumper of the instant invention is designated generally at 16 and comprises an elongated hollow readily collapsible member 18 which is preferably made of a relatively stiff rubber or other similar resilient material. The inner or rear wall 20 of hollow member 18 is thickened and has inserted therein, preferably during manufacture, a plurality of C-shaped metal strips shown generally at 22 having reverted ends 24 which engage the upper and lower edges of facing 12. It should be readily apparent that bumper 16 may be secured on the front as well as the rear of a vehicle and that a plurality of metal strips 22 may be utilized to secure bumper 16 to facing 12 or that any other suitable connecting means may be utilized.

Figure 2:
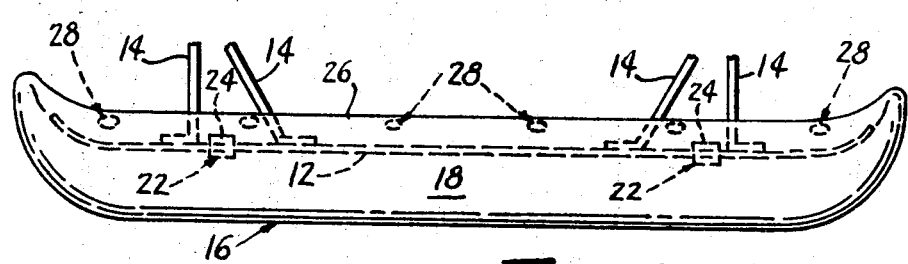
FIG. 2 is a top plan view of the bumper of FIG. 1 and the connecting means for securing it to the vehicle.
Figure 3:
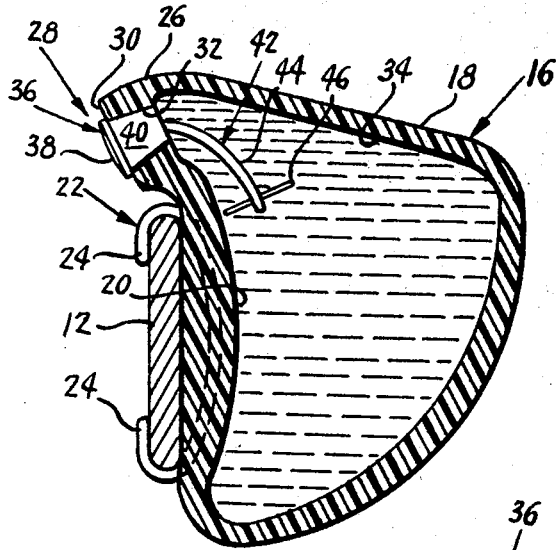
FIG. 3 is an enlarged view of the bumper of the instant invention taken longitudinally with respect to the vehicle along line 3—3 of FIG. 1 as viewed in the direction of the arrows.

As may be seen best in FIGS. 2 and 3, bumper 16 forms a lip 26 overlying facing 12 and metal strips 22 with a plurality of openable closures shown generally at 28 being formed on the rear upwardly inclined face 30 of lip 26. Openable closure 28 includes an opening or passageway 32 formed in lip 22 communicating between compartment 34 of bumper 16 and face 30.

Positioned in each of openable closures 28 is a plug shown generally at 36 comprised of a closure plate 38 positioned exterior of bumper 16 and resilient annular wall 40 in close engagement with passageway 32 of bumper 16. As explained in the aforementioned application, the impact of bumper 16 with another object will increase the pressure of a liquid in compartment 34 such that plug 36 is separated from opening 32 to allow a portion of the captive liquid to escape. Since closures 28 constitute a restricted opening, it will be readily apparent that bumper 16 collapses relatively slowly so that the effect is that of yielding with the impact forces rather than having a direct shock imparted through a normally rigid bumper to the vehicle.

One difficulty with the device of the aforementioned application is that opening 32 becomes deformed because of stresses created in lip 26 as previously intimated. Although opening 32 is preferably circular, it will be apparent that deformation thereof will produce a noncircular opening thereby tending to jam a solid plug therein. Unless the captive liquid in compartment 34 can be released in a relatively slow fashion, it will be apparent that an impact force will be directly imparted to the vehicle thereby defeating the purpose of bumper 16. Since annular wall 40 is made of a resilient material, such as rubber or the like, it will accommodate the deformations of passageway 32 and will separate therefrom upon the impact of bumper 16 with another object regardless of the deformed condition of opening 32. Stated differently, the annular wall 40 of plug 36 deforms commensurately with the deformation of lip 26 regardless of the state of deformation of opening 32.

Figures 4, 5:
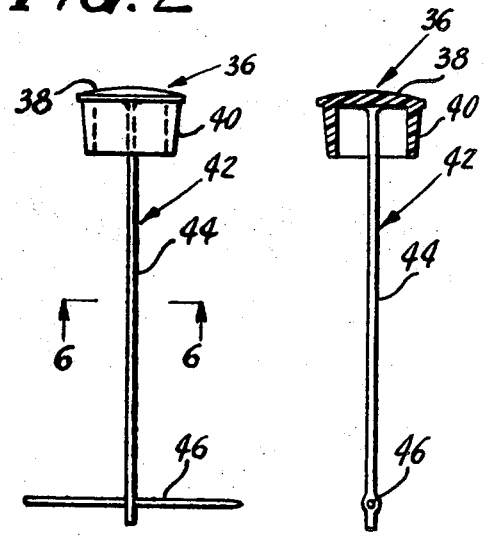
FIG. 4 is an enlarged side elevational view of the plug of the instant invention.
FIG. 5 is a longitudinal cross-sectional view of the plug of FIG. 4.
Figure 6:
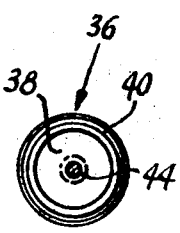
FIG. 6 is a cross-sectional view of the plug of FIG. 4 taken substantially along line 6—6 thereof as viewed in the direction indicated by the arrows.

Another important feature of plug 36 is a retaining means shown generally at 42 which acts to retain closure plate 38 and annular wall 40 in spaced relation with respect to bumper 16 after plug 36 has separated from lip 26. Retaining means 42 includes a flexible rod 44 affixed in any suitable manner to closure plate 38 and a cross bar 46 secured to flexible rod 44 adjacent the end thereof. As illustrated in FIGS. 4 and 5, cross bar 46 is inserted through a small opening formed in flexible rod 44 with cross bar 46 being retained therein by the flexible characteristics of rod 44. Since retaining means 42 is positioned inside compartment 34 when plug 36 is in the position shown in FIG. 3, it is apparent that the unsightly characteristic of retaining chains or other suitable retainers is avoided.

It is now seen that there is herein provided an improved shock proof bumper which accomplishes all of the objects of the instant invention and others, including many advantages of great practical utility and commercial importance.

Since many embodiments may be made of the instant invention and since many modifications may be made in the embodiment hereinbefore shown and described, it is to be understood that the foregoing is to be interpreted merely as illustrative and not in a limiting sense.

I claim:

1. In a shock proof buffer assembly comprising a relatively rigid backing plate consisting of an extending portion of the frame of a standard motor vehicle, an elongated hollow body member comprised of a resilient material of sufficient rigidity normally to retain a predetermined shape, and of sufficient strength to resist rupture upon impact thereagainst, means on one longitudinal edge of said body member securing said member to said backing plate, liquid normally filling said member, said member having at least one passageway defining opening therein, means normally closing said opening, whereby an impact against said member serves to displace said means normally closing said opening, to permit the escape of at least a portion of said liquid through said passageway in a quantity and at a rate of escape commensurate with the severity of the impact and the consequent deformation of said body member, the improvement wherein:
   a. said opening is deformable by the liquid upon impact; and
   b. said means normally closing said opening is commensurately deformable with respect to the deformability of said opening.

2. The shock proof bumper of claim 1 wherein the closing means includes a deformable annular wall in engagement with the interior wall of the opening and a closure plate, affixed to the annular wall, exteriorly of the hollow member.

3. The shock proof bumper of claim 2 wherein the annular wall is resilient.

4. The shock proof bumper of claim 3 further including means retaining the plug and hollow member in spaced relation upon separation of the plug and hollow member.

5. The shock proof bumper of claim 4 wherein the retaining means includes a flexible member, affixed to the closure plate, extending into the hollow member and a cross bar, on the flexible rod, spaced from the plug.

6. In a shock proof buffer of the type comprising an elongate hollow member, constructed of resilient material having sufficient rigidity normally to retain its shape, which is normally filled with liquid and secured to a backing support plate on a vehicle, said hollow member having a passageway defining opening therein and a releasable plug normally closing the opening, the improvement wherein:
   a. the opening is resiliently deformable by the liquid upon impact of the hollow object with another object;
   b. the plug is commensurately deformable with respect to the deformability of the opening; and
   c. whereby upon impact the liquid in the hollow member may deform the opening and force the plug from the opening and escape through said opening in a quantity and at a rate commensurate with the severity of the impact and the deformation of the hollow member.

7. The invention of claim 6 wherein the plug includes a deformable annular wall in engagement with the interior wall of the opening and a closure plate, affixed to the annular wall, exteriorly of the hollow member.

8. The invention of claim 7 wherein the annular wall is resilient.

9. The invention of claim 8 further including means retaining the plug and hollow member in spaced relation upon separation of the plug and hollow member.

10. The invention of claim 9 wherein the retaining means includes a flexible member, affixed to the closure plate, extending into the hollow member and a crossbar, on the flexible rod, spaced from the plug.